United States Patent [19]
Junes

[11] 3,922,972
[45] Dec. 2, 1975

[54] TROLLEY DEVICE

[76] Inventor: Norman E. Junes, Rte. Box 148, Astoria, Oreg. 97103

[22] Filed: Aug. 26, 1974

[21] Appl. No.: 500,596

[52] U.S. Cl. .............................. 105/153; 104/112
[51] Int. Cl.² ........................................ B61B 3/00
[58] Field of Search .......... 105/148, 150, 151, 153, 105/154, 156, 152; 104/89, 93, 106, 110, 112, 113; 191/59, 61, 62, 63, 63.1, 76

[56] References Cited
UNITED STATES PATENTS

| | | | |
|---|---|---|---|
| 947,436 | 1/1910 | Downs | 191/76 |
| 1,392,820 | 10/1921 | Davis | 105/150 X |
| 1,747,388 | 2/1930 | Pearson | 105/153 |

*Primary Examiner*—John J. Love
*Attorney, Agent, or Firm*—Lee R. Schermerhorn

[57] ABSTRACT

A trolley for an animal leash or message carrier rides on a trolley wire which is suspended by guy wires that may form angle points to place the trolley wire in a polygonal pattern. In order to pass the angle points freely, the trolley is suspended by pulley means which provide one point support, and is retained on the trolley wire by cooperating lower pulley means. Disengagement of the pulleys from the trolley wire is prevented by intermeshing gear arrangements in three different embodiments. One embodiment is capable of passing vertical guy wires or lateral guy wires extending from opposite sides of the trolley wire.

8 Claims, 10 Drawing Figures

U.S. Patent Dec. 2, 1975 Sheet 1 of 2 3,922,972
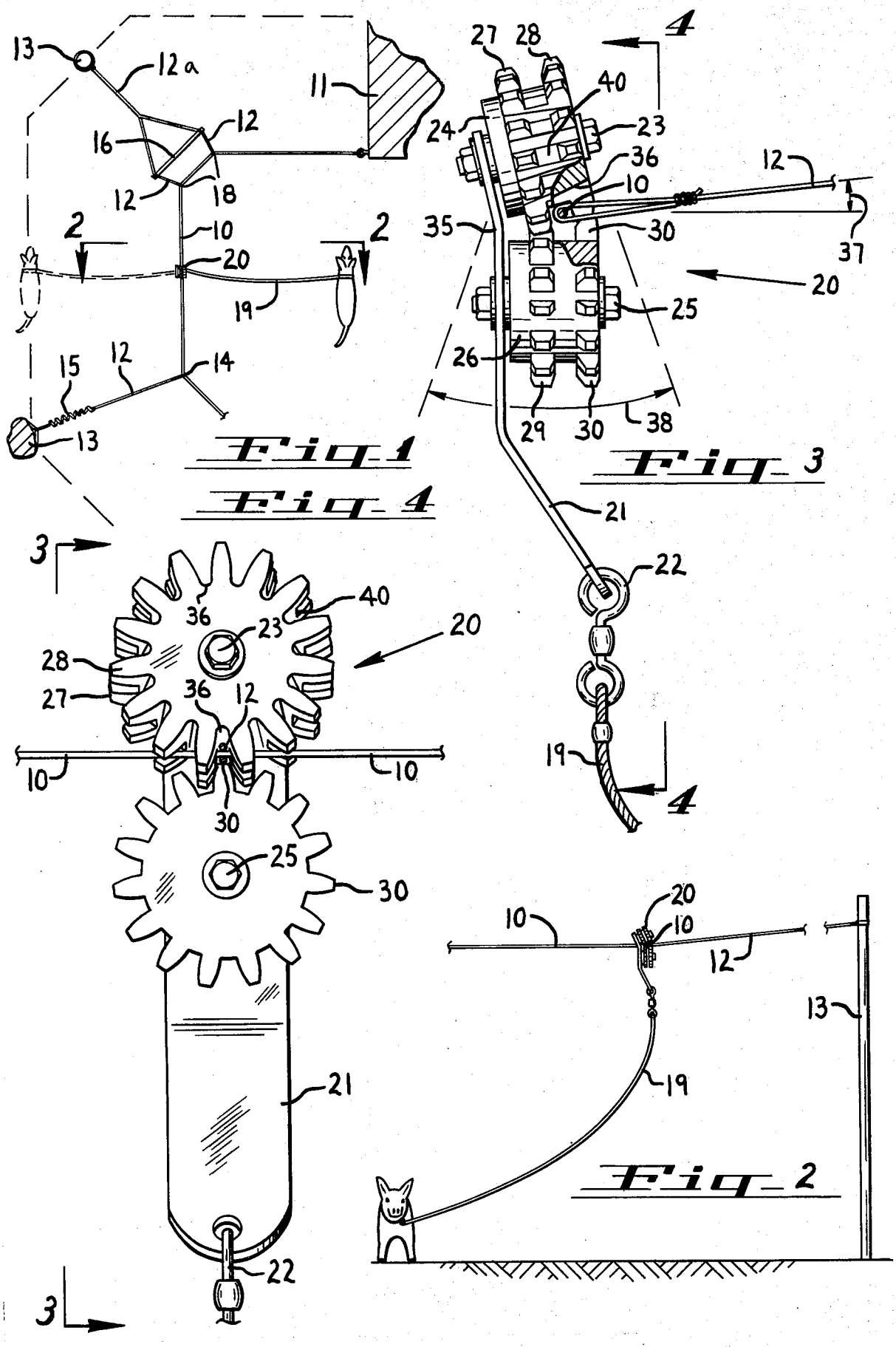
Fig_1
Fig_4
Fig_3
Fig_2

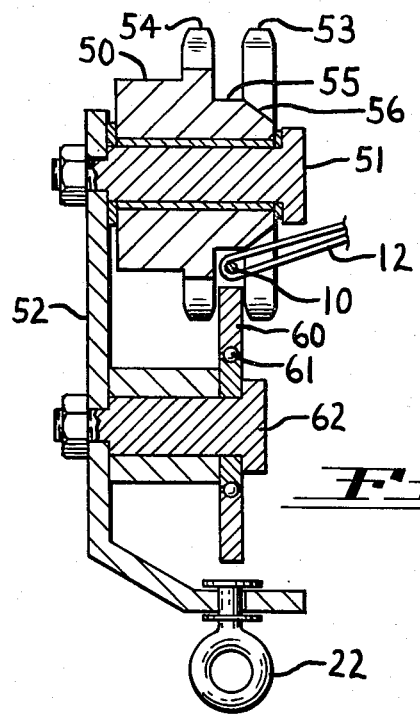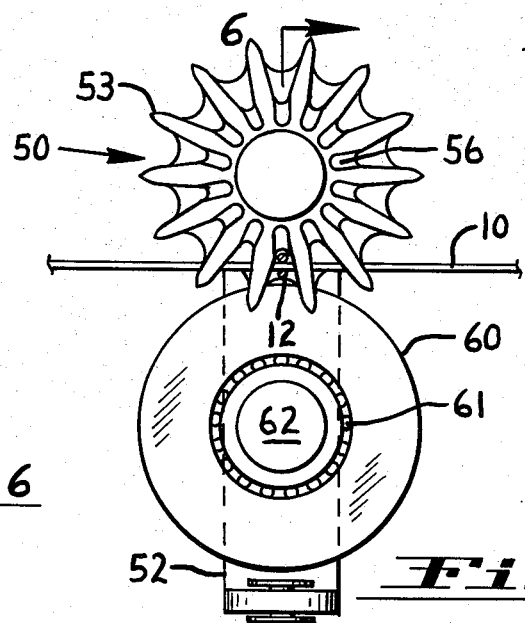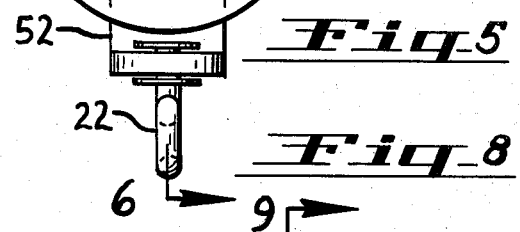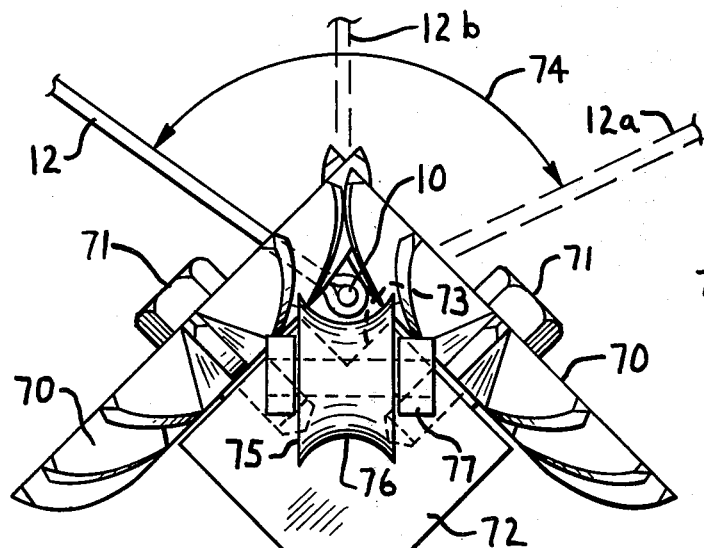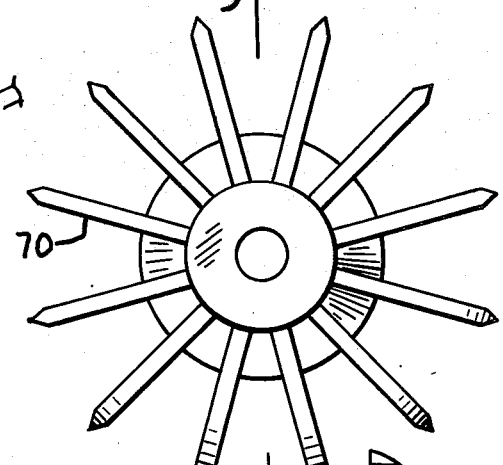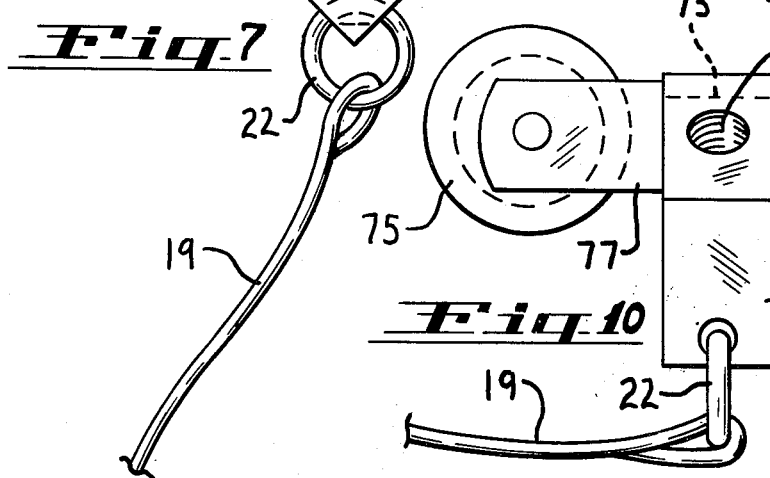

TROLLEY DEVICE

BACKGROUND OF THE INVENTION

This invention relates to a trolley device, as for exampale a pet trolley for providing a tethered animal with a range of freedom extending along and on opposite sides of an elevated trolley wire. The trolley may also be used for other purposes such as for carrying messages or articles on a wire track.

In previous trolley devices the trolley support means has had bearing extending for a distance along the trolley wire, making it impossible for the trolley to pass angle points in the trolley wire. This has necessitated special fittings to curve the trolley wire at its angle points, making the trolleys too complicated and expensive for general acceptance by the public. Also, previous trolley devices have not been capable of passing both vertical and lateral guy wires.

Objects of the invention are, therefore, to provide an improved trolley device, to provide a trolley which will freely pass angle points in a trolley wire, to provide a trolley having a one point support on a trolley wire, to provide a trolley capable of passing vertical guy wires and lateral guy wires extending from opposite sides of a trolley wire, and to provide a trolley of the type described having a relatively simple and inexpensive form of construction.

SUMMARY OF THE INVENTION

Three embodiments are illustrated, each having one point support on a trolley wire so as to pass angle points in a polygonal pattern without special fittings to curve the angle points in the trolley wire. Different arrangements of intermeshing gears retain the trolley on the trolley wire while permitting the trolley to pass supporting guy wires. In one embodiment the trolley is capable of passing vertical guy wires as well as lateral guy wires, extending from opposite sides of the trolley wire.

The invention will be better understood and additional objects and advantages will become apparent from the following description of the preferred embodiments illustrated in the accompanying drawings. Various changes may be made, however, in the details of construction and arrangement of parts and certain features may be used without others. All such modifications within the scope of the appended claims are included in the invention.

BRIEF DESCRIPTION OF THE DRAWINGS

FIG. 1 is a plan view showing a first embodiment of the present trolley on a trolley wire which is supported in a polygonal pattern by lateral guy wires;

FIG. 2 is a view on the line 2—2 in FIG. 1;

FIG. 3 is a view on the line 3—3 in FIG. 4 with parts broken away;

FIG. 4 is a view on the line 4—4 in FIG. 3;

FIG. 5 is a side elevation view of a modification;

FIG. 6 is a view on the line 6—6 in FIG. 5;

FIG. 7 is an end elevation view of a further modification;

FIG. 8 is a view showing one of the bevel gears in FIG. 7;

FIG. 9 is a view on the line 9—9 in FIG. 8; and

FIG. 10 is a side elevation view of the trolley in FIG. 7 with the bevel gears removed.

DESCRIPTION OF THE PREFERRED EMBODIMENTS

In FIG. 1, one end of trolley wire 10 is anchored to building 11. Other portions of the trolley wire are supported by approximately horizontal lateral guy wires 12 and 12a from available trees or posts 13 on one side of the trolley wire to impart a polygonal pattern to the trolley wire. Some or all of the guy wires may be equipped with tension springs 15.

When the change in direction of trolley wire 10 does not exceed about 45°, each guy wire 12 may be connected directly to the trolley wire as at angle point 14. When the change in direction exceeds about 45°, a spreader bar 16 with two short guy wires 12 may be used to form two angle points 18 with smaller deflection angles.

The opposite end of the trolley wire may be anchored on building 11 to close the polygon or it may be anchored to a tree or post or another building to define an incomplete polygon having an open side. Pet leash 19 is connected to a trolley 20 which may be pulled back and forth on trolley wire 10 to provide a suitable range of freedom for a pet along and on opposite sides of the trolley wire as indicated in broken lines.

Trolley 20 comprises a generally vertical trolley body plate 21 having a leash connection 22 on its lower end. On the upper end of trolley plate 21 a perpendicular bolt 23 provides a shaft for an upper roller 24 and a lower perpendicular bolt 25 provides a shaft for a lower roller 26. On the upper roller 24, spur gear teeth 27 provide an inner radial flange adjacent plate 21 and spur gear teeth 28 provide an outer radial flange to form a pulley which rides on trolley wire 10. Similarly, on lower roller 26, spur gear teeth 29 form an inner pulley flange adjacent plate 21 and spur gear teeth 30 form an outer pulley flange on the underside of the trolley wire.

In order to pass approximately horizontal guy wires 12, extra clearance space is provided between upper roller 24 and the ends of teeth 30 on the lower roller. Either one or both of two possible means may be provided to accomplish this additional clearance space. By way of illustration, the present trolley utilizes both means although either one may be sufficient in certain cases.

The first means for increasing the tooth clearance between rollers 24 and the ends of teeth 30 is by forming a horizontal bend at 35 in trolley plate 21 between the bolts 23 and 25, causing the axes of the bolts and rollers to assume a divergent relationship as shown in FIG. 3. The second means for increasing the tooth clearance is by forming inclined grooves 36 between the teeth 28 on the upper roller. Thus, the tooth clearance is increased sufficiently to allow not only for the thickness of guy wires 12 but also to allow for an angle of sag in the guy wires as indicated at 37 and an angle of sway for the trolley plate 21 as indicated at 38 when the animal pulls the leash to one side or the other of the trolley wire.

Grooves 36 may extend back between the teeth 27, leaving axial lands 40 between the teeth 27 and 28 to form an interrupted pulley surface on roller 24 which rides on trolley wire 10. Lands 40 are on the root circle of the teeth 27 and 28 and grooves 36 extend below the root circle.

Thus, teeth 29 interengage with teeth 27 and teeth 30 interengage with teeth 28 whereby trolley wire 10 is confined between the two rollers and the trolley 20 cannot be disengaged from the trolley wire. Since the trolley 20 is supported essentially by one point contact on the trolley wire, the trolley 20 will freely negotiate obtuse angle points 14 without requiring special fittings to provide gradual curves at the angle points. This greatly simplifies the suspension of trolley wire 10 in the back yard or other location where there may be a considerable number of angle points 14 to adapt the pattern of the pet run to the shape of the available area.

In some cases, sufficient tooth clearance between roller 24 and the ends of teeth 30 may be obtained by means of the bend 35 in the trolley plate without forming grooves 36 below the root circle or by utilizing the grooves 36 without the bend 35. Also, the teeth 30 may merely be made shorter. The necessary amount of tooth clearance will depend on such variables as the sag in guy wires 12, the height of trolley wire 10 and the length of leash 19.

It may also be of advantage in some cases to make the roller 26 identical to the roller 24 so that the two rollers may be interchanged after there has been considerable wear on the upper roller. The wear on the lower roller is negligible.

The view in FIG. 3 is the same as the view in FIG. 2 on an enlarged scale. The portion of trolley wire 10 extending to the left in FIG. 2 is in the background behind the angle point 14 while the foreground portion of trolley wire 10 appears in end view.

In the modification in FIGS. 5 and 6, a trolley wire roller 50 is mounted for rotation on a bolt 51 in the upper end of a vertical trolley body plate 52. Roller 50 has outer teeth 53 and inner teeth 54 which provide a circumferential pulley groove 55 between the two sets of teeth to roll on trolley wire 10. At each angle point in the trolley wire, the teeth 53 straddle a nearly horizontal lateral guy wire 12 as shown. Preferably, the axial grooves between teeth 53 are relieved on an angle as indicated at 56 to accommodate inclination of the guy wires 12. Trolley wire 10 is retained in the pulley groove 55 between the teeth 53 and 54 by a retainer roller disc 60 mounted for rotation on ball bearings 61 on a bolt 62 directly below the bolt 51. Disc 60 is of less width than the groove 55 so as to rotate freely between the outer and inner teeth 53 and 54.

The trolley in FIGS. 5 and 6 will operate on the polygonal pattern of trolley wire 10 in FIG. 1 where all the supporting guy wires 12 extend laterally from the same side of the trolley wire.

A more versatile modification is shown in FIGS. 7 to 10. In this embodiment a pair of bevel gears 70 is mounted for rotation on bolts 71 on two adjacent upper faces of a square trolley body block 72. The two gears 70 intermesh with each other in 90° relationship as to roll on trolley wire 10. The upper corner of block 72 is relieved by a groove 73 to clear the trolley wire.

This trolley arrangement has the advantage of being able to pass guy wires extending laterally on either side of trolley wire 10 as indicated at 12 and 12a in FIG. 7 as well as guy wires or suspension wires in vertical positions as indicated at 12b. The guy wires or suspension wires may assume any position within the large angle indicated at 74. This versatility permits use on a trolley wire which zigzags both right and left or follows a straight path as well as a trolley wire in which all deflections are in the same direction.

A pair of guide rollers 75 underlies the trolley wire 10 to prevent the trolley from twisting on the trolley wire. These rollers have broad and shallow grooves 76 and the rollers are mounted close on opposite sides of bevel gears 70 to permit the trolley to negotiate deflection angles in the trolley wire as large as 45° in either direction at the angle points. Rollers 75 are mounted on short bracket arms 77 extending from opposite sides of trolley body block 72 as shown in FIG. 10 wherein the bolts 71 for bevel gears 70 have been removed from the bolt holes 78 in the trolley body block.

The teeth of bevel gears 70 are preferably relatively long and narrow as shown in FIG. 8 and each gear is mounted for rotation on ball bearings 79 on an inner ball race 80 in FIG. 9 which receives bolts 71. This tooth configuration provides wide spaces between the teeth to receive guy wires at 12, 12a or 12b.

Thus, the teeth of gears 70 cooperate to form a pulley groove functionally equivalent to pulley groove 40 in FIG. 3 and pulley groove 55 in FIG. 6 in that these gear teeth provide substantially a single point support for the trolley which is capable of negotiating angle points where the trolley wire abruptly changes direction. A conventional trolley support having extended bearing for a distance along the trolley wire cannot pass an angle point where there is an abrupt change in direction.

Although the invention has been described in connection with the tethering of an animal, the present trolleys may also be used for carrying messages or other articles on an overhead trolley wire.

Having now described my invention and in what manner the same may be used, what I claim as new and desire to protect by Letters Patent is:

1. A trolley for use on an overhead trolley wire comprising a body member, roller means on said body member providing essentially one point support for said body member on said trolley wire so that the trolley will pass angle points in the trolley wire where the trolley wire changes direction, gear teeth on said roller means having spaces between said teeth to receive supporting guy wires for said trolley wire at said angle points so that said trolley will pass said guy wires, said roller means having a pulley groove to roll on top of said trolley wire, a retainer roller on said body member arranged to underlie said trolley wire in vertical alignment with said top roller means in order to pass said angle points in said trolley wire, and gear teeth on said retainer roller in mesh with said gear teeth on said top roller means.

2. A trolley as defined in claim 1 the axes of said top roller means and said retainer roller being divergent in a common vertical plane to increase the tooth clearance for passing said guy wires.

3. A trolley for use on an overhead trolley wire comprising a body member, roller means on said body member providing essentially one point support for said body member on said trolley wire so that the trolley will pass angle points in the trolley wire where the trolley wire changes direction, gear teeth on said roller means having spaces between said teeth to receive supporting guy wires for said trolley wires at said angle points so that said trolley will pass said guy wires, said roller means having a pulley groove to roll on top of said trolley wire, and a retainer roller on said body member arranged to underlie said trolley wire in vertical alignment with said top roller means in order to pass said angle points in the trolley wire, said retainer roller comprising a disk rolling in said pulley groove of said top roller means.

4. A trolley for use on an overhead trolley wire comprising a body member, roller means on said body member providing essentially one point support for said body member on said trolley wire so that the trolley will pass angle points in the trolley wire where the trolley wire changes direction, gear teeth on said roller means having spaces between said teeth to receive supporting guy wires for said trolley wire at said angle points so that said trolley will pass said guy wires, said roller means comprising a pair of bevel gears rotatable on inclined axes in a common vertical plane transverse to said trolley wire, the teeth of said gears meshing together above the trolley wire and rolling on said trolley wire, and spaces between said teeth providing clearance to pass guy wires extending upwardly or laterally on either side of said trolley wire.

5. A trolley as defined in claim 4 including retainer roller means on said body member arranged to underlie said trolley wire.

6. A trolley for use on an overhead trolley wire comprising a body member, and a pair of bevel gears on opposite sides of said body member having teeth arranged to mesh together above the trolley wire and roll on the trolley wire to support the trolley, said teeth having spaces therebetween to receive guy wires supporting said trolley wire.

7. A trolley as defined in claim 6, said body underlying said trolley wire.

8. A trolley as defined in claim 7, including guide rollers on said body underlying said trolley wire.

* * * * *